US005525188A

United States Patent [19]

Ingwersen

[11] Patent Number: 5,525,188

[45] Date of Patent: Jun. 11, 1996

[54] APPARATUS FOR TAPING MULTIPLE ELECTRICAL CABLES

[75] Inventor: Peter Ingwersen, Gilberts, Ill.

[73] Assignee: Molex Incorporated, Lisle, Ill.

[21] Appl. No.: 323,563

[22] Filed: Oct. 17, 1994

[51] Int. Cl.$^6$ .............................. B29C 53/46; B32B 3/04; B32B 5/02; H01B 13/06

[52] U.S. Cl. .............................. 156/539; 29/743; 29/745; 29/759; 156/52; 156/204; 156/227; 156/285; 156/382; 156/443; 156/510; 156/543; 156/581; 414/737

[58] Field of Search ................................ 156/47, 51, 52, 156/53, 55, 492, 443, 459, 475, 483, 484, 485, 494, 510, 513, 539, 574, 576, 580, 581, 285, 381, 382, 227, 217, 204, 543; 29/743, 745, 759, 728; 414/737

[56] References Cited

U.S. PATENT DOCUMENTS

| | | | |
|---|---|---|---|
| 3,160,930 | 12/1964 | Fisher | 29/825 X |
| 3,168,617 | 2/1965 | Richter | 156/47 X |
| 3,239,916 | 3/1966 | Love | 29/825 |
| 3,622,687 | 11/1971 | Doughty | 29/825 X |
| 3,955,264 | 5/1976 | Klappert | 29/738 X |
| 4,290,179 | 9/1981 | Bakermans et al. | 29/743 X |
| 4,311,544 | 1/1982 | Salopek et al. | 156/510 |
| 4,360,400 | 11/1982 | Davis et al. | 156/468 |
| 4,457,662 | 7/1984 | Ireland et al. | 29/743 X |
| 4,486,253 | 12/1984 | Gonia | 156/51 |
| 4,767,891 | 8/1988 | Biegon et al. | 174/34 |
| 4,838,407 | 6/1989 | Komuro | 198/406 |
| 4,885,838 | 12/1989 | Ruecker et al. | 29/566.3 |
| 4,923,537 | 5/1990 | Matsushima | 156/52 X |
| 4,980,958 | 1/1991 | Suzuki et al. | 29/33 M |
| 5,005,611 | 4/1991 | Hecker | 140/147 |
| 5,010,642 | 4/1991 | Takahashi et al. | 29/868 |
| 5,274,195 | 12/1993 | Murphy et al. | 156/51 X |

FOREIGN PATENT DOCUMENTS

| | | |
|---|---|---|
| 283207 | 12/1991 | Japan . |
| 159640 | 6/1993 | Japan . |
| 402475 | 1/1974 | U.S.S.R. . |
| 421073 | 8/1974 | U.S.S.R. . |

*Primary Examiner*—Michael W. Ball
*Assistant Examiner*—Francis J. Lorin
*Attorney, Agent, or Firm*—Charles S. Cohen

[57] ABSTRACT

An apparatus for taping wires of a wire harness includes first and second tape application heads interconnected together and disposed proximate to a wire guiding mechanism. Both of the first and second tape application heads have hollow inner cores which communicate with a source of negative air pressure to draw a vacuum in each tape application head which causes a strip of wire tape to adhere to the outer surfaces of the application heads. One of the application heads is brought into contact with a plurality of wires guided across the head, while the second application head rotates around a common axis shared by the two heads, whereby each of the first and second application heads generally oppose each other and apply the strip of tape to the wires.

23 Claims, 5 Drawing Sheets

APPARATUS FOR TAPING MULTIPLE ELECTRICAL CABLES

BACKGROUND OF THE INVENTION

The present invention relates generally to the fabrication of wire harnesses, and more specifically, to the binding together of selective wires in such harnesses.

The fabrication of wire harnesses typically involves the assembly of connector elements to one or both ends of a plurality of wires wherein each wire of the harness represents a single circuit. Wire harnesses may be assembled by terminating opposing ends of the circuit wires to multiple opposing connector elements, and subsequently binding the wires together to form a wire harness. Alternatively, wire harnesses may also be formed by providing two connector elements with the proper number of circuit termination openings and terminating them to opposite ends of the wire. In either means of assembly, the particular application may require that the wires extending between the connector elements of the wire harness be taped, or otherwise held together.

Many patents describe ways in which wires of a harness may be taped together. For example, U.S. Pat. No. 3,245,860 issued Apr. 12, 1966, describes a hand taping system having a taping jaw which receives a preselected number of wires or cables therein. A gear-driven assembly advances a length of tape from a tape supply and feeds the tape to the jaw and around the wires. This type of mechanism is hand-operated and requires an operator to manually apply tape to the wires. It is not capable of automated operation and the labor involved with such a device of this sort adds to the overall increase in the harness fabrication cost.

Other patents, such as U.S. Pat. No. 4,486,253, issued Dec. 4, 1984, describe a method of making multiple conductor cable assemblies in which the wires of the harness are placed into contact with each other and held within a clamp. A solvent is poured into the clamp to partially dissolve the insulation surrounding the conductor portions of the wires. This type of process is complex and involves the careful addition in monitoring the solvent addition which, if not properly supervised, may otherwise entirely dissolve the insulation of the wires.

Still other patents, such as U.S. Pat. No. 4,767,891, issued Aug. 30, 1988 describe the use of laminated carrier films applied to both sides of the wires to tape the wires together in the harness.

None of the patents described above offers an apparatus useful in selectively taping wires passing in serial order together into sets of predetermined numbers of wires. The present invention is therefore directed to a wire taping apparatus and a method of fabricating wire harnesses which offers advantages over the devices described above and which provides simplified and reliable taping of selected wires together. The taping apparatus of the present invention requires only a single supply of tape and the tape is automatically retained in registration on its assembly head.

SUMMARY OF THE INVENTION

In one principal aspect, the present invention accomplishes these advantages by feeding a plurality of wires across a bifurcated assembly head mounted beneath a conveying bed which feeds the plurality of wires in serial order over the assembly head. The assembly head is bifurcated into two application elements, one of which moves relative to the other. The assembly head contains an interior plenum which communicates with a source of negative air pressure. This negative air pressure is directed from the interior plenum to two opposing tape-receiving surfaces of the two application elements in order to maintain a preselected length of tape in place thereon in a preselected path. One application element of the bifurcated assembly head rotates onto the other in order to contact opposing portions of the wires with a preselected length of wire tape.

In another principal aspect of the present invention, a novel method for assembly wire harness is provided by taping a preselected number of wires together in serial order to assemble a wire harness having multiple electrical connector element on opposing ends of the harness. A supply of tape is drawn across the assembly head underneath a supply of wires are moved above the assembly head. Negative air pressure is supplied to the tape-receiving surfaces of the assembly head application elements to hold the tape in position in place on the application elements. The assembly head is then brought into contact with the wires overlying it and the one application element is rotated into opposition with the other application element to apply a strip of tape to opposing portions of the wires. The tape held by the first application element contacts the lower portions of the wires, while the tape held by the second application element contacts the upper portions of the wires, the upper and lower tape portions being in registration with each other in registration.

In still another aspect of the present invention, one application element includes recesses positioned in its tape-receiving surface which are aligned with intervening open spaces which occur between adjacent wires conveyed above the assembly head. The recesses contain severing knives for cutting the tape between preselected wires after the tape has been applied to opposing upper and lower portions of the wires.

Accordingly, it is an object of the present invention to provide a method and apparatus for the taping together of the preselected number of wires to form a wire harness.

It is a further object of the present invention to provide a taping apparatus in which a single strip of tape is applied to opposing portions of wires of the wire harness to hold the wires together by utilizing a bifurcated application member having first and second application elements, each of the first and second application elements applying a length of tape to opposing sides of the wires.

It is still another object of the present invention to provide an apparatus for taping selected wires of adjacent wire harnesses together, the apparatus having a support track which supports a plurality of wire harnesses which pass therealong in serial order and means for advancing of preselected number of such harnesses in serial order along the support track, the support track having an opening defining a passage over which the wire portions of the wire harness pass and through which a wire taping assembly moves into contact with the wires as they pass along the support track, the taping assembly having first and second tape-applying elements which receive first and second portions of tape thereon, the first and second tape-applying elements being interconnected together, the first tape-applying element being fixed and the second tape-applying element being rotatable about the second tape-applying element to thereby apply the first and second tape lengths to opposing portions of the wires, the first and second tape-applying elements each having pneumatic means for selectively supplying negative air pressure to an outer surface thereof in order to retain respective first and second tape portions in place thereupon.

A still further object of the present invention is to provide a taping apparatus in which a clamping means advances a length of tape from a tape supply across a tape application means, the tape application means having a bifurcated application head, the application head having pneumatic means which applies negative air pressure to selected surfaces of the application head to hold the preselected length of tape in place upon the bifurcated application head, the bifurcated application head folding upon itself to apply two opposing tape lengths to each other across the wires to tape them together.

These and other objects, features and advantages of the present invention will be apparent from a reading of the following detailed description, taken in conjunction with the accompanying drawings wherein like reference numerals refer to like parts.

BRIEF DESCRIPTION OF THE DRAWINGS

In the course of this detailed description, reference will be made to the attached drawings in which.

DETAILED DESCRIPTION OF THE PREFERRED EMBODIMENTS THE TAPING APPARATUS

Figure 1A:
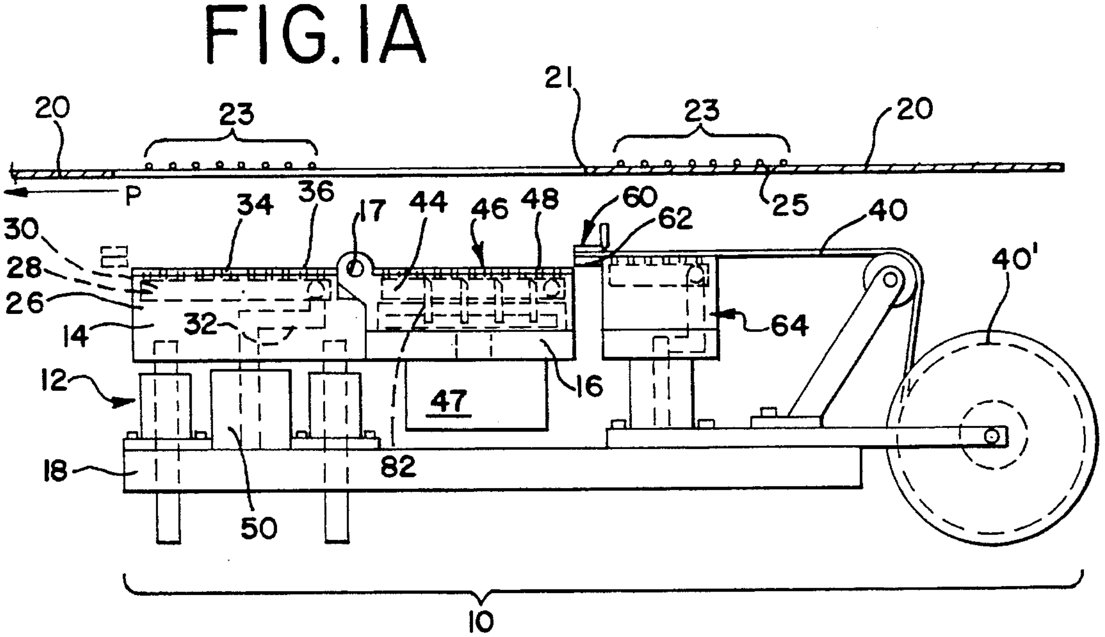
FIG. 1A is an elevational view of a wire harness taping apparatus constructed in accordance with the principals of the present invention.
Figure 1B:
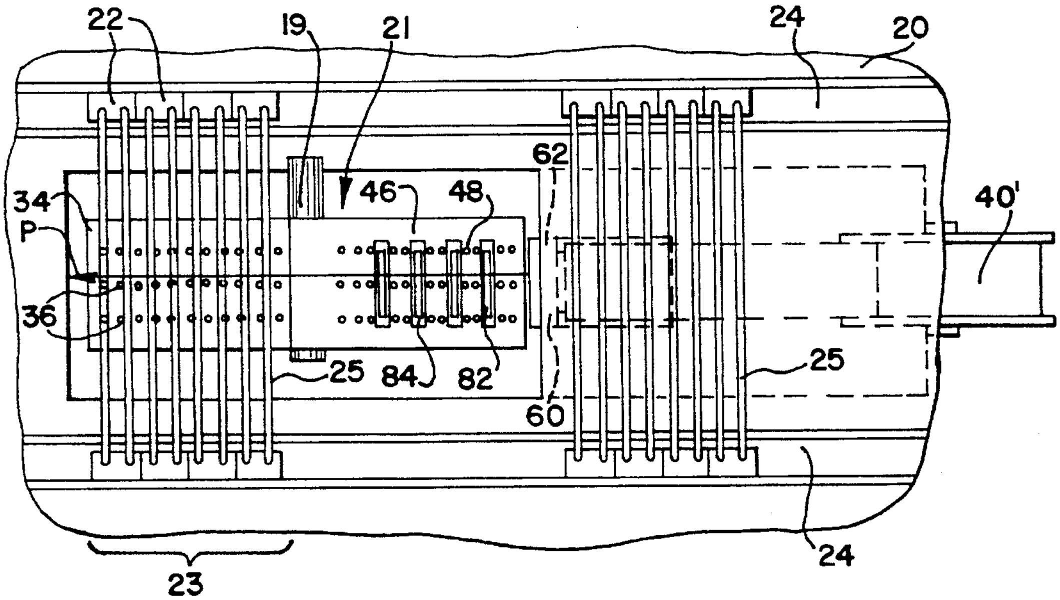
FIG. 1B is a top plan view of the taping apparatus of FIG. 1A.

FIG. 1A illustrates a taping apparatus, generally indicated at 10, constructed in accordance with the principles of the present invention in which a series of cylindrical objects, such as wires, are advanced in successive sets containing a preselected number of wires into position to be taped together by the apparatus 10 to form a taped set or taped subsets. It can be seen that the taping apparatus 10 includes a tape application assembly, generally indicated at 12, having first and second interengaged tape application means in the form of two tape application heads 14 and 16 disposed generally in longitudinal alignment with each other for applying tape 40 from an endless source or reel 40'. The tape application assembly 12 is mounted on a support frame 18 which is disposed proximate to a transfer bed 20 over which sets 23 of wire harnesses 22 which are moved along in serial order through parallel guides 24 (FIG. 1B). The two tape application heads 14, 16 are interconnected to each other by a hinged connection 17 which is shared by the two application heads and around which the second application head 16 rotates.

The first application head 14 has a body 26 with a hollow inner core 28 which defines a plenum 30 which communicates with an internal air conduit 32, and which in turn, communicates with an air source for applying negative air pressure to the plenum 30. The plenum 30 communicates with a tape-receiving surface 34 of the first application head 14 such that when a vacuum is drawn through the conduit 32, air is drawn into the plenum 30 through a series of apertures 36 formed in the first application head tape-receiving surface 34. The apertures 36 are preferably disposed in the tape-receiving surface 34 along an axis thereof in a preselected pattern such that during operation, the apertures 36, plenum 30 and air conduit 32 all cooperate to provide a vacuum force to the outer tape-receiving surface 34 of the first application head 14 to adhere a first portion 38 (FIG. 13) of a tape strip 40 along a preselected path P.

Figure 5:
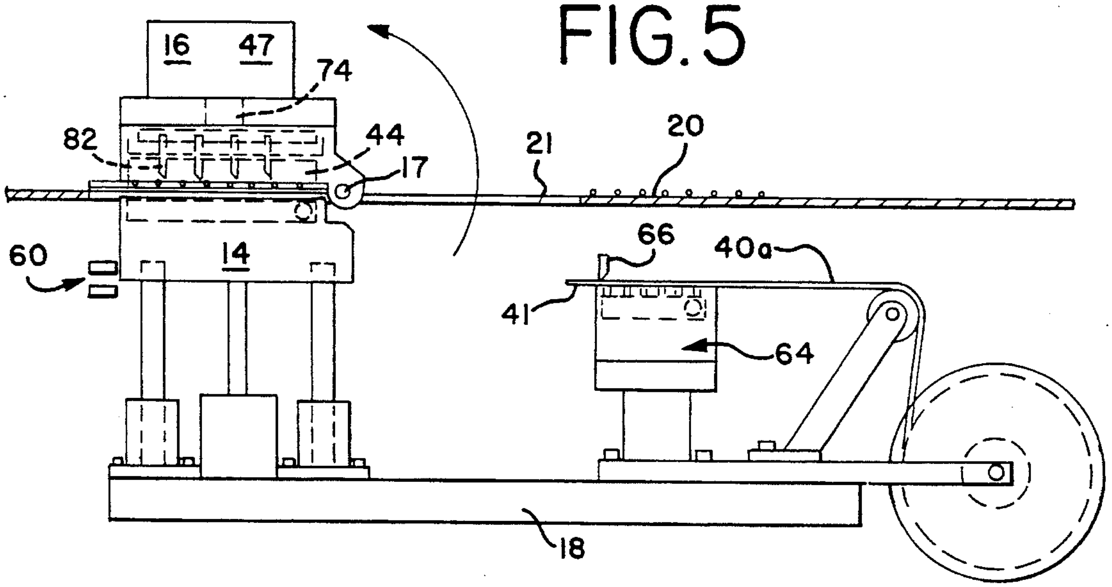
FIG. 5 is a view illustrating how one portion of the bifurcated tape application head rotates to a tape application position whereby tape is applied to opposing portions of the wires.
Figure 6:
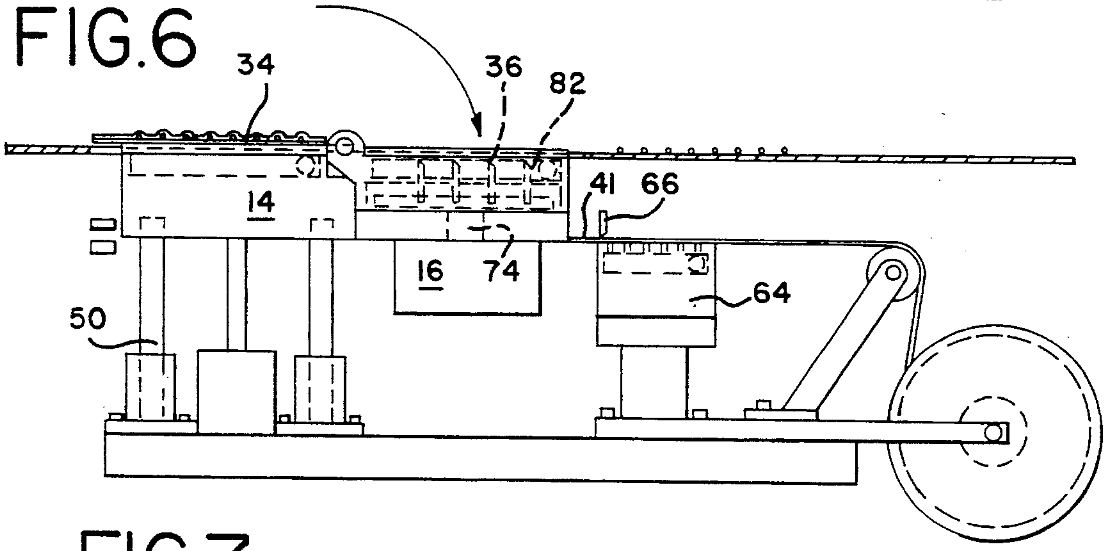
FIG. 6 is a view illustrating how the bifurcated tape application head opens after the wires have been taped and cut into preselected segments.
Figure 7:
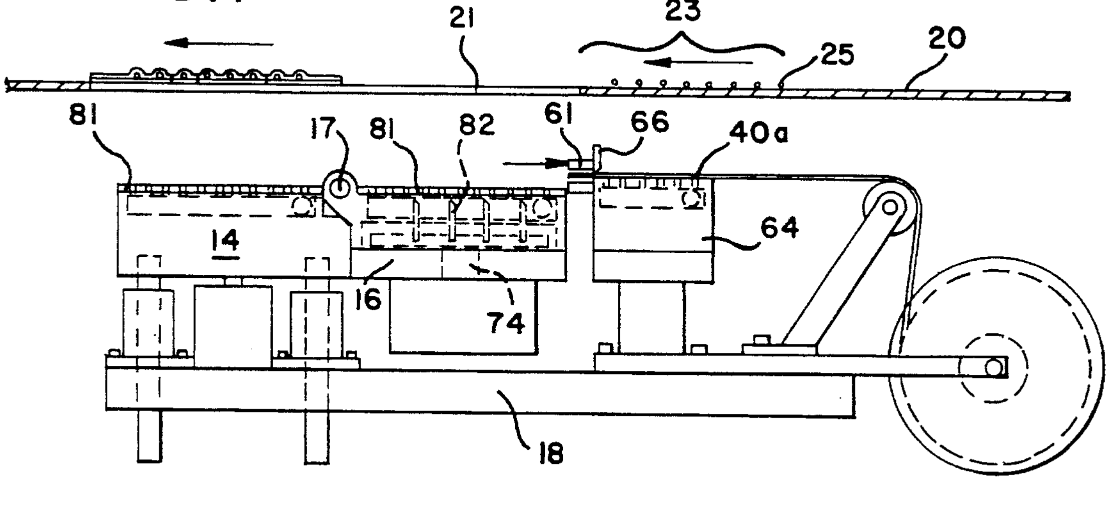
FIG. 7 is a view illustrating how the tape application head and the tape advancement mechanism returns to an initial position.

As mentioned above, the second application head 16 rotates around its hinged connection 17 to overlie the first application head 14 (FIG. 5) and provides a means for applying a second portion 39 of the wire tape strip 40 to the wires 25 of each set 23 of harnesses 22 which are disposed over the application assembly 12. Similar to the construction of the first application head 14, the second application head 16 also includes a hollow inner core defining a plenum 44 within the second application head 16. The plenum 44 may communicate with the first application head plenum 30 or air conduit 32 and the negative air pressure supplied to its tape-receiving surface 46, or it may draw upon an alternate means of supplying negative air pressure, such as by its own vacuum pump. The second application head tape-receiving surface 46 also includes a plurality of air apertures 48 disposed thereon in a suitable preselected array or pattern. When a vacuum is drawn in the second application head plenum 44, air is consequently drawn through the apertures to provide a vacuum force which holds the tape strip second portion 39 (FIG. 3) on the second tape application head tape-receiving surface 46. The second tape application head 16 is driven about its hinged connection 17 by rotary cylinder 19 (FIG. 1A) positioned on the axis through connection 17.

Figure 12:
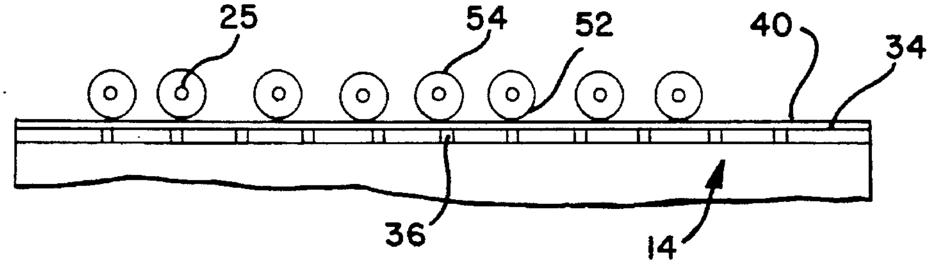
FIG. 12 is an enlarged elevational view of the tape-receiving surface of the first application head in registration with wires of a harness.

The two tape application heads 14, 16 (FIG. 1) are mounted on a support frame 18 in alignment with an opening 21 formed in the transfer bed 20. The first application head 14 is preferably vertically reciprocatably mounted on the frame 18 by way of telescoping cylinder 50 which selectively elevates the head 14 into contact with the selected sets 23 of wires 25 passing overhead along the transfer bed 20. Cylinder 50 is preferably pneumatically operated, but may also be operated by other suitable means such as by hydraulic cylinders, motors or the like. The cylinder 50 raises the first application head 14 a sufficient distance in order for the tape-receiving surface 34 thereof to be positioned adjacent the lower portions 52 of the wires 25 of the harness set 23 located along the transfer bed opening 21 over the tape application assembly 12. When contact is made, the first portion 38 of tape held on the first application head tape-receiving surface 34 contacts the lower portions 52 of the wires 25 (FIG. 12).

The second tape application head 16 is rotated about connection 17 by cylinder 19 and passes through the transfer bed opening 21 about the connection 24, (FIG. 5) and adopts a position wherein the tape-receiving surfaces 34, 46 are generally aligned with and oppose each other. This movement causes the second portion 39 of the tape strip to contact the upper portions 54 (FIG. 13) of the wires 25. As will be explained in greater detail below, the tape strip 40 is advanced across the two tape application heads 14, 16 by a single advancement assembly 60 (FIG. 1A) in its predetermined path P.

Figure 13:
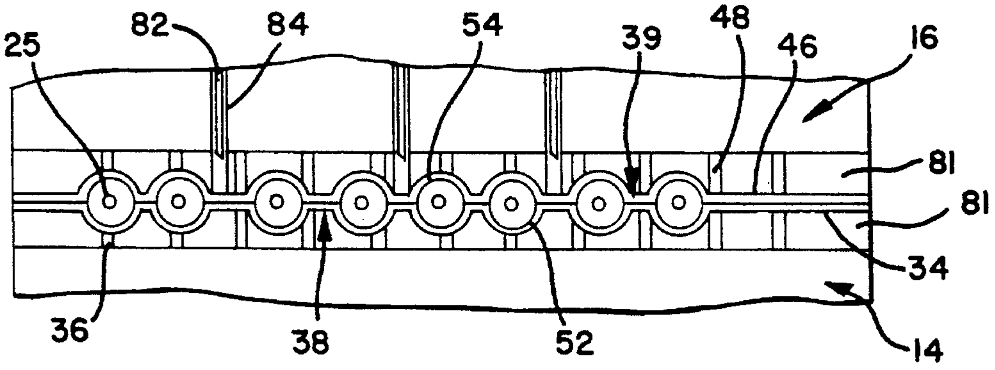
FIG. 13 is an enlarged view of the tape-receiving surfaces of the tape application assembly in a tape application position in contact with opposing portions of wires of a harness; and, FIG. 14 is an enlarged cross-sectional view of the second application head of the taping apparatus of the present invention illustrating a severing knife in place within a recess.

After the second tape application head 16 is rotated over the first tape application head 14, the two application heads 14, 16 are urged together (by continued rotation) to apply their respective first and second tape portions 38, 39 to the opposing portions 52, 54 of the wires. In this regard the tape-receiving surfaces 36, 46 of the tape application heads 14, 16 may include a layer of compliant material 81 which, as illustrated in FIG. 13, will deform around the wires 25 to apply the tape portions 38, 39 thereto. Suitable examples of such a compliant material are urethane, neoprene and the like. Alternatively, one or both of the two application heads 14, 16 may receive positive air pressure from their respective plenums which will force the first and second tape portions 38, 39 onto the opposing portions of the wires and onto each other in the intervening spaces between the wires.

After the tape has been applied to the wires, one or more severing knives 82 received within corresponding recesses 84 of the second application head 16 may be selectively actuated through pneumatic cylinder 47 to extend out of recesses 84 therein into contact with the tape to sever the tape applied to the wires in selected locations. The severing knives 82 permit cutting of the tape at selected intervals which is advantageous in the assembly of wire harnesses. In this regard, the second application head 16 may include a plurality of recesses 84 disposed therein at locations aligned with the intervening spaces which occur between adjacent wires.

Each such recess 84 need not have a severing knife 82 located therein, but the structure of the recesses is preferably such to permit the operator to insert of severing knives 82 only in particular recesses 84 which will correspond to the desired spacing of wires in the final harnesses.

Figure 14:
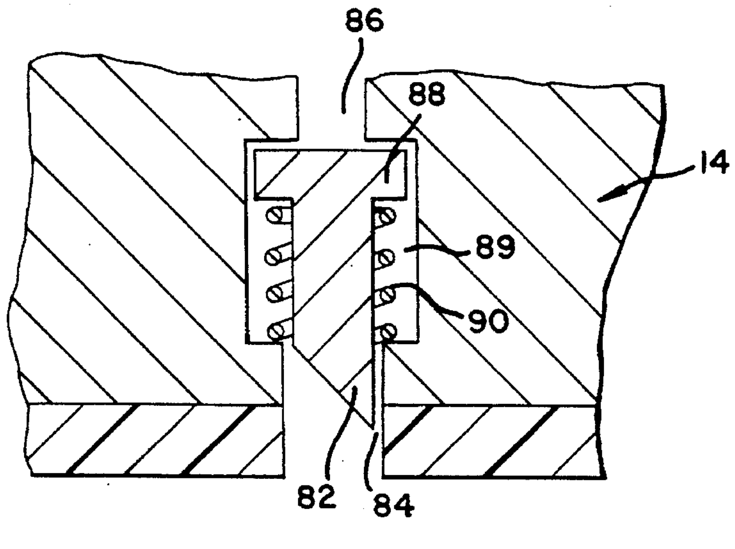

An alternative embodiment contemplates the recess 84 including a port 86 in communication with the plenum of the second application head 16 through which positive air pressure may be supplied to base portions 88 of the knives 82 in order to urge them out from the recesses 84 in a cutting stroke into contact with the tape 40. In such an arrangement, the knives 82 may include a means to limit their stroke out of the recesses 84, such as guides 88 (FIG. 14), received in adjoining cavities 89 which engage the recesses 84. The guides 88 reciprocate within their associated cavities 89 and stop the knives from leaving the cavities. When a cutting stroke has been completed. negative air pressure may be supplied to the recesses to draw the knives back into the recesses. Alternatively, the knives 82 may include a means for biasing them back into a recessed position such as a suitable compression spring 90.

Figure 2:
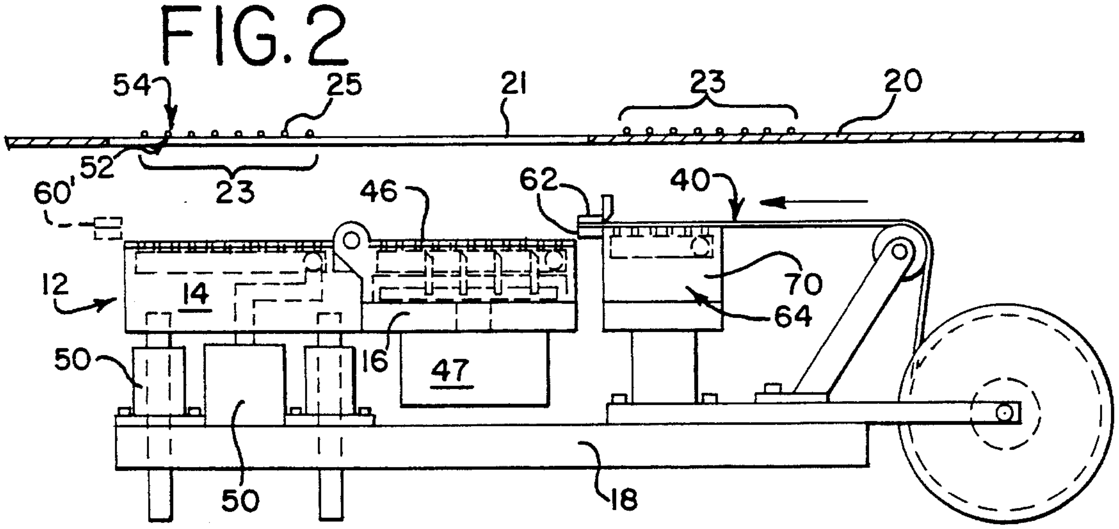
FIG. 2 is an elevational view of the taping apparatus of FIG. 1A in a ready position wherein the wires are positioned in registration with the tape application head and the tape is indexed for advancement by the tape advancement mechanism.
Figure 3:
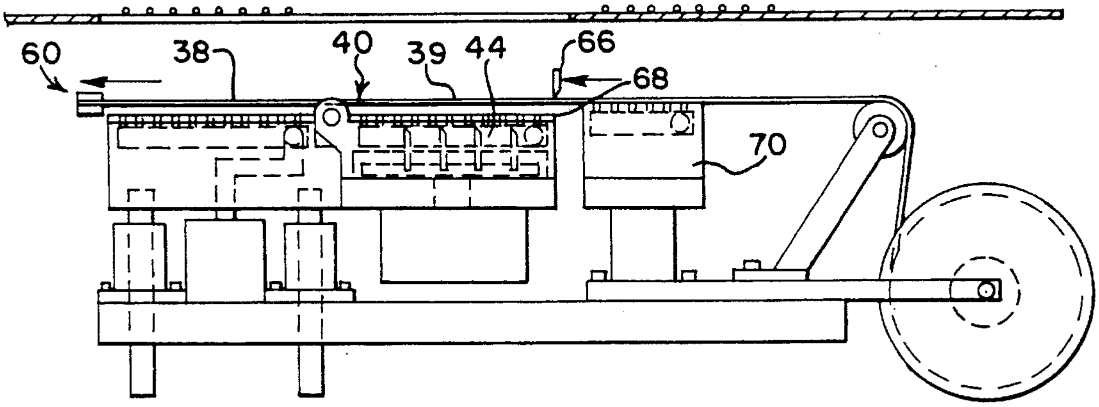
FIG. 3 is a view illustrating how a length of tape is advanced over the tape application head by the tape advancement mechanism.

As mentioned above, the apparatus 10 includes a means for advancing successive length of tape strips 40, 40*a* into registration with the application assembly 12, in the form of a slidable tape clamp assembly 60 (FIG. 1A) having a pair of jaws 62 which are interposed in the path P of the tape strip 40. The jaws 62 open and close upon receipt of a signal from a control means (not shown) and further reciprocate linearly above the support frame 18 in a direction generally parallel to path P. The jaws reciprocate between a location just downstream (to the left in FIG. 1A) of the tape indexing assembly 64 and a location just downstream of the first tape application head 14 (shown in phantom in FIGS. 1A and 2 as 60'). The tape clamp assembly 60 engages a leading edge 41 of the tape strip 40 which extends forwardly of the tape registration assembly 64 and grips it in order to subsequently advance the tape strip 40 downstream over the tape application assembly 12 (FIG. 3). The clamping assembly 60 holds the tape strip 40 in place until a tape application cycle is initiated and the tape application assembly 12 is brought into contact with the tape strip 40 and a vacuum is drawn within the first and second tape application heads to retain the first and second portions 38, 39 of the-tape strip 40 in place on the respective tape-receiving surfaces 34, 36. When properly positioned over the application assembly 12 and the two tape-receiving surfaces 34, 46 thereof, a severing knife 66 which is positioned adjacent the trailing or upstream edge 68 of the second application head 16 (FIG. 3) severs the tape strip 40 as the tape application assembly 12 advances vertically into contact with the tape strip 40. The severing knife 66 is movable along path P between a first position at the downstream edge of tape indexing assembly 64 and a second position at the upstream edge 68 of second application head 16. When positioned at its first position, clearance is provided to permit clamping assembly 60 to grip the leading edge 41 of the tape. When positioned at its second position, the knife is positioned to cut the tape.

Figure 4:
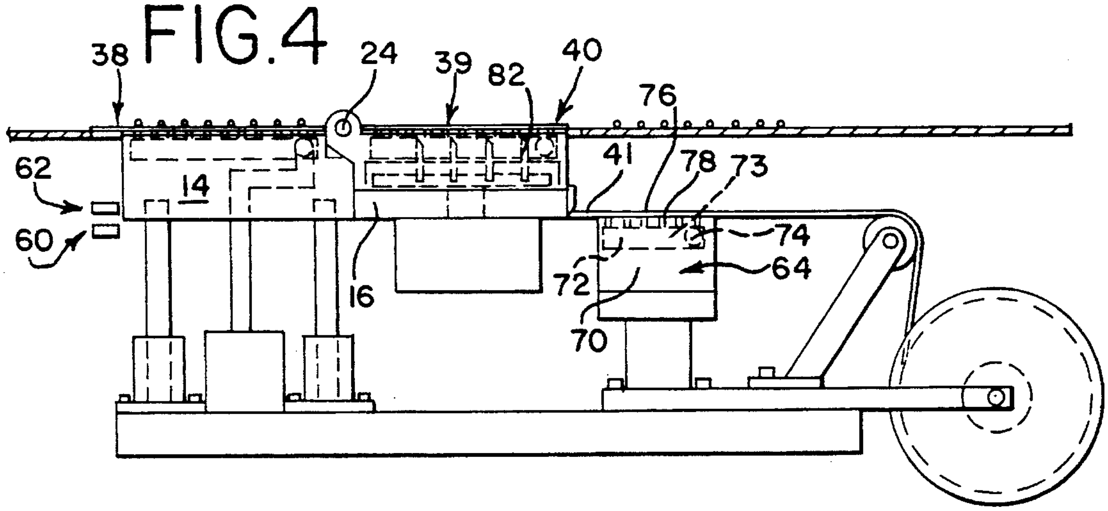
FIG. 4 is a view illustrating how the tape application head is initially brought into contact with the wire tape and the wires.

The remaining portion of the tape strip 40 is held in place upon the tape indexing assembly 64 on a pedestal portion 70 thereof (FIG. 4). The pedestal portion 70 preferably includes an inner core portion 72, shown as a pneumatic manifold 73, which communicates with an air conduit 74. Negative air pressure is supplied to this manifold 73, and is further supplied to a tape-receiving surface 76 of the indexing assembly 64 by way of apertures 78. When a vacuum is drawn on the manifold 73, a portion of a succeeding tape strip 40*a* is held in place on the pedestal portion 70. A leading edge 80 of the succeeding tape strip 40*a* projects forwardly of the pedestal 70 in position to be received by the clamping assembly 60.

The Taping Apparatus as Part of A Harness Assembly Machine

Figure 8:
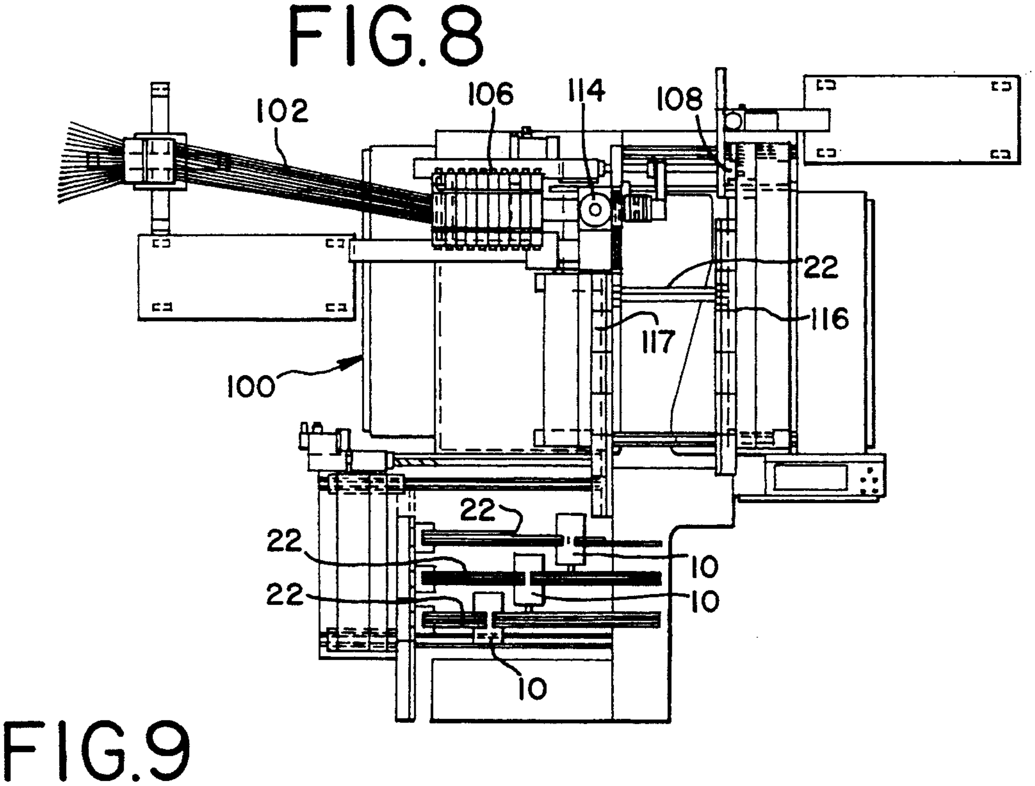
FIG. 8 is a plan view of the wire termination machine utilizing the taping apparatus of the present invention.

The taping apparatus 10 is intended to be incorporated within an overall wire harness-making machine 100 as illustrated in FIG. 8. In such a wire harness-making machine, a plurality of wires 102 and connector elements 104 are assembled into finished wire harnesses of the styles illustrated, for example, in FIGS. 10 and 11.

Figure 9:
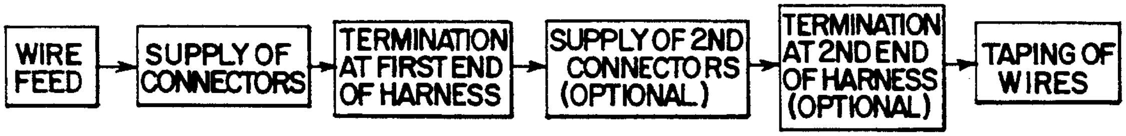
FIG. 9 is a flow diagram setting forth the sequence of steps utilized in the processing of wire harnesses using the wire termination machine of FIG. 8.

The preferred operational sequence of the harness-making machine is set forth in the flow diagram of FIG. 9. The harnesses are produced by feeding individual wires 102 from supply sources, with each wire being preferably driven by its own individual servomotor 106. These motors 106 advance the wires to a termination station 114 where free ends of the wires are advanced into wire-receiving receptacles of the connector elements 104 which have been previously fed to the termination station 114 from a supply station 108.

Once a series of connector elements 104 are fed to the termination station 114, the free ends of the wires are advanced into termination locations within the connector elements 104. After the first set of wire ends is terminated to the connector elements, the terminated connector elements are preferably urged to a first connector element conveying track 116, located opposite the termination station 114. The wires are also advanced a predetermined length which corresponds to the length of the wires in the final assembled wire harness. The trailing portion of the wires are then cut to create trailing free ends. These trailing free ends are terminated to one or more second connector elements to form a series of completed wire harnesses. After the second connector elements are terminated to the wires, the completed harnesses are transferred to other work stations by moving along two parallel conveying tracks 116, 117. It will be understood that the harnesses made by such a machine need not have connector elements terminated at both ends thereof.

One or more taping apparatuses 10 are preferably located downstream, relative to tracks 116, 117, of the termination station 114. At this location, successive sets of wire harnesses, each containing a predetermined number of wires, are moved into registration with the taping apparatus 10 and the transfer bed opening 21.

Once positioned in registration with the tape application assembly 12, the tape application assembly is actuated as described above to apply tape to the harness. Tape may be applied at different locations relative to the longitudinal axis of the harnesses by staggering multiple tape application assemblies as shown in FIG. 8.

Wire Harnesses Processed by the Taping Apparatus

Figure 10:
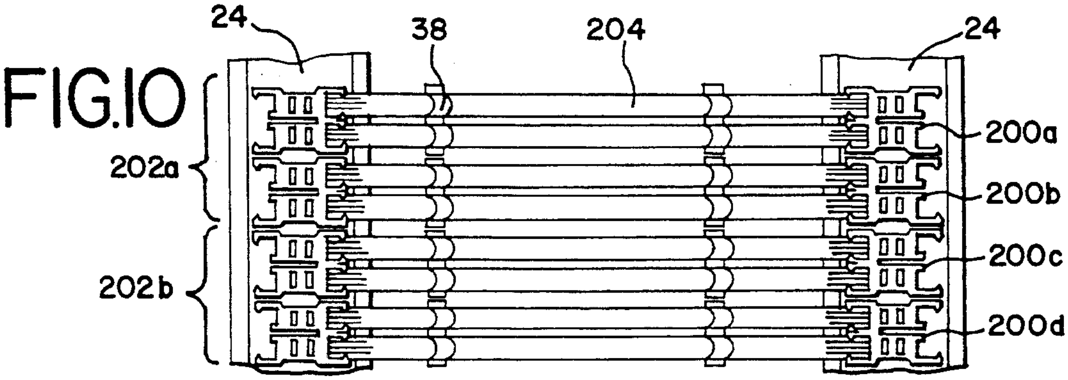
FIG. 10 is an enlarged top view of a series of wire harnesses processed by the present invention in place within the machine of FIG. 8 illustrating a series of 4-circuit wire harnesses.
Figure 11:
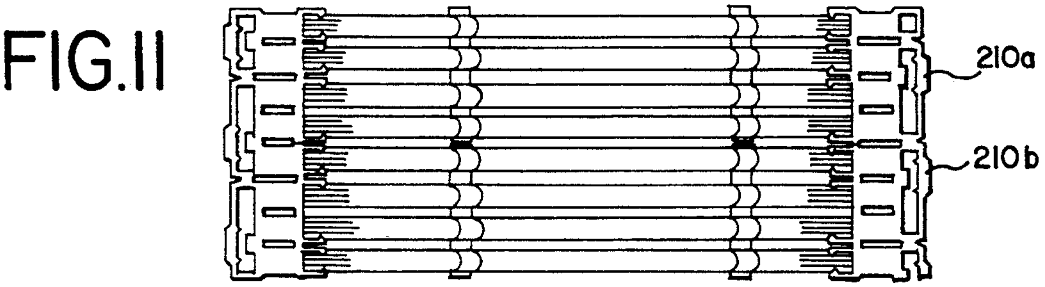
FIG. 11 is a plan view of the series of three 2-circuit wire harnesses taped together using the present invention to form 6-circuit harnesses.

The present invention provides a significant amount of flexibility to manufacture harnesses quickly and of different configurations. For example, the harness making machine 100 set forth in FIG. 8, can simultaneously terminate a plurality of individual harnesses. For example, if the harness making machine is capable of terminating sixteen positions, it can terminate eight harnesses with two wires each, four harnesses with four wires each, etc. After termination, if it is desired to tape the individual wires of each harness together, the present invention provides an efficient manner to do so. This is accomplished by applying tape to all of the wires and then cutting the tape between the wires that are adjacent other harnesses. FIGS. 10 & 11 illustrate two sets of wire harnesses formed with different taping intervals which exemplify just two of the many taping intervals obtainable with the present invention.

For example, FIG. 10 illustrates a series of 2-circuit wire harnesses 200*a–d* which are supported by the transfer bed guide slots 24 in their passage over the taping apparatus 10, and which have been taped together to form a series of successive 2-circuit wire harnesses. The wires 204 of these harnesses comprise a single set of wires which are passed over the tape application assembly 12 and are taped together as a single set of wires in the manner explained above and as illustrated in FIGS. 2–7. When these wires assume a registration position, the two tape application heads 14, 16 apply their first and second tape portions 38, 39 to the wires. Because the final harnesses are desired to have two 2-circuit harnesses taped together, severing knives 82 are used to cut the tape between the second and third wires, the fourth and fifth wires and the sixth and seventh wires of the set. This separates the taped wires into the four separate 2-circuit harnesses.

Similarly, FIG. 11 illustrates a pair of 4-circuit wire harnesses 210*a–b* which may be produced by the taping apparatus 10 of the present invention. These harnesses are produced by passing a set of eight wires along the transfer bed 20 over the tape application assembly 12. The set of wires are positioned over the first tape application head 12, and the second tape application head 14 is rotated into contact therewith until the first and second tape portions 38, 39 are applied to opposing portions of the 12 wires as a set. Once taped, the tape is separated into two 4-circuit harnesses when a severing knife is urged from its recess in the second application head 16 to cut the tape between the fourth and fifth wires of the set.

It can be seen that the taping of the harnesses and severing of the tape to define selected subsets of wires within the set of wires being processed (if desired) may be accomplished in one step leading to faster processing of harnesses.

It will be appreciated that the embodiments of the present invention have discussed herein are merely illustrative of a few applications of the principles of the invention. Numerous modifications may be made by those skilled in the art without departing from the true spirit and scope of the invention.

We claim:

1. A method for taping together a plurality of wires comprising the steps of:

passing a preselected number of wires along a support means;

providing a taping member proximate to said support means, the taping member having first and second tape-receiving surfaces disposed thereon, said first and second tape-receiving surfaces being interengaged with each other in a manner to thereby permit said second tape-receiving surface to move from a first position at which said first and second tape-receiving surfaces are generally coplanar to a second position at which the first and second tape receiving surfaces generally oppose each other;

feeding a length of tape over said taping member and retaining said length of tape on said taping member first and second tape-receiving surfaces while said surfaces are located at said position, said length of tape being divided into first and second tape lengths;

engaging a first portion of said wires with said first tape length;

rotating said second tape-receiving surface over said first tape-receiving surface and engaging a second portion of said wires with said second tape length, said second portion being disposed generally opposite said first portion; and, disengaging said taping member from said first and second portions of said wires.

2. The method of claim 1, including the step of applying negative air pressure to said taping member first and second tape-receiving surfaces to retain said first and second tape lengths thereon.

3. The method of claim 1, wherein said first portion of said wires is engaged by bringing said first tape-receiving surface toward said wires such that said first tape length contacts said wires.

4. The method of claim 1, wherein said second tape length engages said second portions of said wires by rotating said second tape-receiving surface about a given point such that said first and second tape-receiving surfaces generally oppose each other and said wires are disposed between said first and second tape-receiving surfaces.

5. The method of claim 1, including the step of selectively cutting said tape length in areas which lie between adjacent wires.

6. A wire harness binding apparatus for binding together selected wires of a plurality of wires in a wire harness, the wires having a preselected length and two opposing ends, said wires being terminated at one of said two opposing ends by at least one connector element, the apparatus comprising:

tape feed means for feeding a preselected length of tape from a tape supply into a registration position wherein the length of tape is generally disposed transversely to said wires;

tape application means for applying said length of tape to opposite portions of said wires to bind said wires together, the tape application means having first and second head portions, each with a generally planar tape receiving face which receives and retains said length of tape in said transverse position, the first and second head portions being interengaged with each other in a manner to thereby permit said second head portion to move from a first position at which said tape receiving faces of said first and second head portions are generally coplanar to a second position at which said tape receiving faces of said first and second head portions generally oppose each other, said first head portion receiving a first part of said length of tape and said second head portion receiving a second part of said length of tape, and whereby, when said second head portion is rotated over said first head portion, said tape receiving faces of said two head portions oppose each other and apply said first and second parts of said length of tape to opposing portions of said wires; and, tape cutting means for selectively cutting said length of tape at selected positions between said wires.

7. A wire harness binding apparatus as set forth in claim 6, wherein said tape application means includes pneumatic means for supplying negative air pressure to at least a portion of said two tape-receiving faces to maintain said length of tape in place upon said first and second head portions.

8. A wire harness binding apparatus as set forth in claim 7, wherein said tape-receiving faces include a plurality of air apertures communicating with an interior plenum of said tape application means.

9. A wire harness binding apparatus as set forth in claim 7, wherein said tape application means includes means for stopping flow of said negative air pressure to said two tape receiving faces.

10. A wire harness binding apparatus as set forth in claim 6, wherein said tape feed means includes clamping means for selectively clamping an edge of said length of tape, the clamping means being movable along a predetermined path which feeds said length of tape over said tape application means.

11. A wire harness binding apparatus as set forth in claim 10, wherein said predetermined path is generally perpendicular to longitudinal axes of said wires of said wire harness.

12. A wire harness binding apparatus as set forth in claim 7, wherein said tape feed means includes tape holding means and second pneumatic means for applying negative air pressure to the tape holding means, said tape holding means holding said length of tape for engagement by said tape feed means.

13. A wire harness binding apparatus as set forth in claim 6, wherein said tape application means is movable between a tape-receiving position and a tape-application position.

14. A wire harness binding apparatus as set forth in claim 13, wherein said tape application means is pneumatically operated.

15. A wire harness binding apparatus as set forth in claim 6, wherein at least one of said tape receiving faces of said head portions includes a layer of compliant material thereon.

16. In an electrical harness making machine for making electrical harness assemblies from a plurality of wires wherein each wire assembly includes a plurality of wires extending generally alongside each other, a preselected number of the wires being terminated at a common end to a connector element, the machine including a supply of wires, means for feeding said preselected number of wires from said wire supply to a termination location, a supply of connector elements, means for feeding said connector elements to a termination assembly at said termination location, means for terminating said common ends of said preselected numbers of wires into said connector element at said termination assembly, means for advancing said terminated harness assemblies in serial order out of said terminating means, and means for taping said wires together, said taping means comprising:

a support member for supporting said harness assemblies in said serial order, means for advancing said harness assemblies along said support member into a position ready for taping, a tape supply, means for advancing a length of tape from said tape supply along a path generally transverse to said wires, a tape application member disposed along said path and proximate to said support member, the tape application member being moveable between a first operative position wherein said tape application member is aligned with said tape advancing means and a second operative position wherein said tape application member contacts said harness assemblies, said tape application member having a tape-receiving portion adapted to receive said length of tape advanced from said tape advancing means, the tape receiving portion having two tape-receiving surfaces defined thereon, one of said two tape-receiving surfaces being displaceable about the other of said two tape-receiving surfaces such that said one tape-receiving surface may be rotated over said other of said two tape-receiving surfaces, whereby said two tape-receiving surfaces generally oppose each other and apply said length of tape disposed on said opposing two tape-receiving surfaces onto opposing portions of said wires of said harness assemblies to thereby tape said wires together.

17. The harness-making machine of claim 16, wherein said tape application member includes first pneumatic means for maintaining said length of tape upon said two tape-receiving surfaces in said path.

18. The harness-making machine of claim 16, wherein said tape advancing means includes a tape clamping member which is movable along said path.

19. The harness-making machine of claim 16, wherein said tape application member includes severing means for selectively severing tape applied to said wires within intervening spaces which occur between adjacent wires of said harness assemblies.

20. The harness-making machine of claim 16, further including first and second pneumatic means for supplying negative air pressure to selective surfaces of said taping means for maintaining said length of tape in said path.

21. The harness-making machine of claim 20, wherein said first pneumatic means is operatively associated with said tape application member and said second pneumatic means is operatively associated with said tape advancing means.

22. The harness-making machine of claim 21, wherein said first pneumatic means supplies said negative air pressure to said two tape-receiving surfaces and said second pneumatic means supply said negative air pressure to an indexing surface of said tape advancing means.

23. The harness-making machine of claim 20, wherein said two tape-receiving surfaces each include a plurality of air passages in communication with said first pneumatic means and said tape advancing means includes a tape-indexing support member having a tape-receiving surface, the tape indexing support member including a plurality of air passages in communication with said second pneumatic means.

* * * * *